US012617636B2

(12) United States Patent (10) Patent No.: US 12,617,636 B2
Sanders (45) Date of Patent: May 5, 2026

(54) UNLOADING DEVICE

(71) Applicant: Deutsche Post AG, Bonn (DE)

(72) Inventor: Redland Sanders, Solihull (GB)

(73) Assignee: Deutsche Post AG, Bonn (DE)

( * ) Notice: Subject to any disclaimer, the term of this patent is extended or adjusted under 35 U.S.C. 154(b) by 802 days.

(21) Appl. No.: 17/946,478

(22) Filed: Sep. 16, 2022

(65) Prior Publication Data

US 2023/0079659 A1 Mar. 16, 2023

(30) Foreign Application Priority Data

Sep. 16, 2021 (EP) ..................................... 21197232

(51) Int. Cl.
*B65G 65/02* (2006.01)
*B65G 1/04* (2006.01)
*B65G 1/06* (2006.01)
*B65G 1/137* (2006.01)
*B65G 1/16* (2006.01)
(Continued)

(52) U.S. Cl.
CPC ........... *B65G 65/02* (2013.01); *B65G 1/0492* (2013.01); *B65G 1/065* (2013.01); *B65G 1/1376* (2013.01); *B65G 1/16* (2013.01); *B65G 1/20* (2013.01); *B65G 65/005* (2013.01); *B65G 2201/0258* (2013.01); *B65G 2203/041* (2013.01); *B65G 2811/0663* (2013.01)

(58) Field of Classification Search
CPC ...... B65G 65/02; B65G 1/0492; B65G 1/065;

B65G 1/1376; B65G 1/16; B65G 1/20; B65G 65/005; B65G 2201/0258; B65G 2203/041; B65G 2811/0663
See application file for complete search history.

(56) References Cited

U.S. PATENT DOCUMENTS

| | | | | |
|---|---|---|---|---|
| 8,972,045 B1* | 3/2015 | Mountz | ................ | G06Q 10/087 |
| | | | | 700/229 |
| 11,630,447 B1* | 4/2023 | Bhaskaran | ........... | G05D 1/0088 |
| | | | | 700/245 |

(Continued)

FOREIGN PATENT DOCUMENTS

| | | |
|---|---|---|
| CN | 107635891 A | 1/2018 |
| CN | 111620024 A | 9/2020 |

(Continued)

OTHER PUBLICATIONS

Extended European Search Report for corresponding EP Application No. 21197232,8, mailed on Mar. 3, 2022, 7 pages.

(Continued)

*Primary Examiner* — Thomas Randazzo

(74) *Attorney, Agent, or Firm* — Dority & Manning, P.A.

(57) ABSTRACT

An unloading device for unloading a tote from a shelf in a warehouse includes at least two arms for grabbing the tote in the shelf, whereby the arms essentially each extend in a horizontal direction and are arranged distant and parallel to each other. The arms are movable in a vertical and/or horizontal direction in respect to a position of the tote in the shelf and in their horizontal distance to each other in respect to the shape of the tote. Additionally, each arm includes a motorized conveyer belt extending along the essential horizontal direction on the arm up to touching a tip of the respective arm for unloading the tote from the shelf.

11 Claims, 5 Drawing Sheets

(51) Int. Cl.
   *B65G 1/20*       (2006.01)
   *B65G 65/00*     (2006.01)

(56)          References Cited

U.S. PATENT DOCUMENTS

| | | | |
|---|---|---|---|
| 2020/0324976 A1* | 10/2020 | Diehr | B65G 1/0492 |
| 2020/0339350 A1 | 10/2020 | Dooley et al. | |
| 2021/0090001 A1* | 3/2021 | Glass | G06Q 10/08 |
| 2021/0171141 A1* | 6/2021 | Finke | B66F 9/19 |
| 2021/0395014 A1* | 12/2021 | Chen | B25J 9/1653 |
| 2023/0312247 A1* | 10/2023 | Kuroda | B65G 1/1373 |
| | | | 414/279 |

FOREIGN PATENT DOCUMENTS

| | | | |
|---|---|---|---|
| CN | 112919375 A | 6/2021 | |
| DE | 1953270 A1 | 11/1970 | |
| DE | 3444093 A1 | 6/1986 | |
| FR | 2324543 A1 | 4/1977 | |
| KR | 20140018420 A | 2/2014 | |

OTHER PUBLICATIONS

Office Action (with English translation) received in corresponding Application No. CN 2022110782669, dated Apr. 7, 2025, 12 pages.

* cited by examiner

UNLOADING DEVICE

CROSS-REFERENCE TO RELATED APPLICATIONS

This application is based upon and claims the right of priority to EP patent application Ser. No. 21/197,232.8, filed on Sep. 16, 2021, the disclosure of which is hereby incorporated by reference in its entirety for all purposes.

TECHNICAL FIELD

The invention relates to an unloading device for unloading a tote from a shelf in a warehouse. The unloading device comprises at least two arms for grabbing the tote in the shelf and a roller belt adjoining the at least two arms for dispatching the tote unloaded from the shelf, whereby the arms essentially each extend in a horizontal direction and are arranged distant and parallel to each other.

BACKGROUND ART

Conventionally, forklifts or lift trucks are used for unloading a tote from a shelf in a warehouse. The forklifts or lift trucks comprise a fork with two arms that are inserted into or moved underneath the tote standing in the shelf. The arms are lifted so that the tote stands on the arms of the fork and does not stand on the shelf anymore and are pulled backwards to unload the tote from the shelf.

These forklifts or lift trucks usually need to be controlled by an employee who drives the forklift or lift truck to the shelf where the tote to be unloaded stands in and which is usually permanently installed. The arms of the forklifts or lift trucks are movable in a vertical direction to lift the tote off the shelf. Sometimes the arms are also movable in a horizontal direction to adjust the distance of one arm to the other. Nevertheless, it is necessary to fully insert the arms into or move them underneath the tote so that the tote stands securely on the arms and to pull back the whole forklift or lift trucks to move the tote backwards and unload the tote from the shelf. Especially with heavy totes, this can require a great deal of effort. The whole forklift or lift truck with its arms must first be pushed forward, respectively inserted, lifted together with the weight of the tote and then pulled back.

However, such forklifts or lift trucks known from prior art do not yet provide an automatic and convenient solution for unloading a tote from a shelf.

SUMMARY OF THE INVENTION

It is an object to provide an unloading device which makes it possible to automatically unload totes of different sizes easily and without a great effort from a shelf.

The object is solved by the features of the independent claims. Preferred implementations are described in the sub claims.

Therefore, an unloading device for unloading a tote from a shelf in a warehouse is provided. The unloading device comprises at least two arms for grabbing the tote in the shelf and a roller belt adjoining the at least two arms for dispatching the tote unloaded from the shelf, whereby the arms essentially each extend in a horizontal direction and are arranged distant and parallel to each other, the arms are movable in a vertical and/or horizontal direction in respect to a position of the tote in the shelf and/or in their horizontal distance to each other in respect to the shape of the tote, and each arm comprises a motorized conveyer belt extending along the essential horizontal direction on the arm for unloading the tote from the shelf in particular in essentially horizontal direction onto the roller belt.

It is thus an essential point that, due to the arms that are movable in respect to the position and shape of the tote and to the conveyer belt, it is possible to unload individual totes without a great effort in a particular automated manner from the shelf via the arms onto the roller belt. The proposed solution does thus allow a seamless unloading of the tote from the shelf directly onto the roller belt. In other words, the proposed solution allows for an unloading without changing the unloading direction of the tote. The arms are preferably automatically drivable to an unloading position in respect to the individual shape and position of the tote that needs to be unloaded. Once tips of the arms touch the tote, the tote may get in contact with the conveyer belt. The conveyer belt may then, preferably after slightly lifting up the arms, pull the tote backwards onto the arms. By doing so an unloading solution is provided for unloading individual totes in a safe and easy manner, in particular without moving the whole unloading device. Alternatively, the arms, once in contact with the tote, may be lifted slightly up and may afterwards be retracted for moving the tote out of the shelf.

The unloading device can be used for any kind of totes. Preferably, the tote is provided as a container and/or as a pallet, wherein individual goods can be stored. The tote can also be provided as intermediate bulk container and/or pallet, also known as intermediate bulk container (IBC) tote or IBC pallet, which are industrial-grade containers engineered for the mass handling, transport, and storage of liquids, semi-solids, pastes, or solids. The tote can be provided as flexible tote for example made of plastic or as rigid tote, wherein the tote is preferably reusable, allowing cleaning and multiple uses. The shelf can be any kind of shelf suitable for storing totes therein. Preferably, the shelf is motorized for in particular autonomously moving within the warehouse towards the unloading device. In this respect the unloading device is preferably arranged in a fixed position on the ground. Alternatively, the unloading device can be movably, while the shelf is fixed or movably as well. If the unloading device is fixed, several different shelfs may autonomously move towards the unloading device for being unloaded. It is self-evident that the unloading device may also be used for loading the tote from said unloading device respectively loading device into the shelf.

The at least two arms may be provided as forklifts or lift trucks known from prior art. The at least two arms may be pivotally arranged on the unloading device such that the tips can be horizontally move up and down for example 5°, 10° or 15°. The arms may be actuated by a motor and/or a hydraulic system for moving the arms up and down, for extending and retracting the arms and/or for swiveling the arms. The conveyer belt may comprise a rip-like structure and/or may be made from plastics, in particular from rubber, and/or may comprise a rubber surface resulting in a reliable contact with the tote. While not explicitly disclosed, the unloading device can also be used for loading a tote from the roller belt into the shelf in a seamlessly manner.

In a preferred implementation the roller belt extends away from the unloading device seamlessly, opposite and/or parallel to the at least two arms. Thus, during unloading from the shelf onto the roller belt the unloading direction may not change, for example may be linear. In this respect the roller belt may be arranged 'behind' the arms such that the tote can be moved first by the arms onto the roller belt and thereafter in the same direction away from the arms by the roller belt.

In another preferred implementation the motorized conveyer belt extends along the essential horizontal direction on the arm up to touching a tip of the respective arm. Up to touching the tip means that the conveyer belt does not end for example a couple of centimeters before the tip, as known from prior art installations, but rather that the conveyer belt extends up to a front end i.e. the tip of the arm. Such feature has been proven very effective and reliant for unloading the tote from the shelf in a secure and fast manner.

According to a preferred implementation, the conveyer belt is led circumferentially around at least the tip and/or wherein the motorized conveyer belt extends along a complete extension of the arm. The conveyer belt may thus not only be arranged on the top side of the arms. The conveyer belt may rather circulate the arms. This means that the conveyer belt is preferably arranged on the top side and on the bottom side of the arms and is led circumferentially around the tip of the arms. The conveyer belt may extend on the bottom side of the arms in a direction away from the unloading device, runs around the tip of the arms so that the conveyer belt moves on the top side towards the unloading device. Preferably, the conveyer belt is led circumferentially around both tips of each arm so that the conveyer belt is completely revolving around each arm and/or extends along the complete extension of the arms on both sides.

According to a preferred implementation, the unloading device comprises a scanner configured for determining a machine-readable code on the tote comprising a required vertical position, horizontal position and/or distance of the arms for unloading the tote from the shelf and/or for determining the position and/or shape of the tote in the shelf in respect to the required vertical position, the horizontal position and/or distance of the arms for unloading the tote from the shelf. The tote can comprise for example a barcode and/or a QR code and/or a RFID transponder attached thereon. The machine-readable code may comprise different tote information such as weight, height, length, width, and/or a distance of recesses into which the arms can be inserted. Accordingly, it is intended that the tote to be unloaded, respectively its machine-readable code, can be scanned and the unloading device receives thereupon the tote information of this individual scanned tote for example how to drive the arms correctly in the unloading position for unloading this scanned tote. The information can be stored and requested centrally. Alternatively, the scanner may determine the position and/or shape of the tote in the shelf and based thereupon automatically move the arms in the required vertical position, horizontal position and/or distance of the arms so that the tote can be unloaded from the shelf. Further alternatively, the unloading device may receive respective information in respect to position and/or shape of the tote in the shelf for moving the arms in the required vertical position, horizontal position and/or distance of the arms so that the tote can be unloaded from the shelf from a central computing device in advance of the shelf approaching the unloading device. The scanner can be provided as a camera.

Alternatively or supplementary, according to a preferred implementation, the unloading device comprises a control device configured for receiving the position and/or shape of the tote in the shelf in respect to the required vertical position and/or distance of the arms for unloading the tote from the shelf and configured for moving the arms in the vertical and/or horizontal direction in respect to the received position and/or shape. The sequence of totes that are unloaded can be planned in advance. A generated unloading plan may not only comprise the sequence of totes to be unloaded, but also the tote information of each individual tote that are needed to drive the arms correctly in the unloading position.

In principle, it is possible that the tote can be placed by the motorized conveyer belt on several platforms as tables or pallets. According to the proposed solution, the unloading device comprises a roller belt, on which the unloaded tote can be placed by the motorized conveyer belt. After the tote has been unloaded and positioned on the conveyer belt, the tote can be moved further away from the unloading device. Preferably, the roller belt can be arranged directly adjacent to an end of the conveyer belt so that the tote can be transported via the conveyer belt away from the shelf towards the roller belt. From the roller belt the tote can be for example withdrawn or forwarded in several directions according to a content of the tote. It is therefore possible to unload the tote from the shelf and to forward the tote to the roller belt or to an adjacent further conveyer belt without changing the direction of the conveyer belt of the unloading device. The conveyer belt can run continuously in the same direction while unloading and forwarding the tote so that small time delays during the change of direction of the conveyer belt during the unloading process, as they occur in prior art, can be avoided.

According to a preferred implementation, the unloading device comprises a machine guarding for laterally guarding the tote when unloading the tote from the shelf. The machine guarding can be for example a metal grid or a net. If the shelf is in an unloading position, the machine guarding preferably extends along the whole length of the shelf and the arms so that the tote is guided during the complete unloading process. More preferably, the shelf can drive between the machine guiding so that not only the tote is guided during the unloading process, but also the shelf is guided during driving towards the unloading device and positioning the shelf into the unloading position.

The object is further solved by an unloading arrangement comprising the unloading device described above and a shelf configured for storing a plurality of totes horizontally and/or vertically besides each other and configured as robotic shelf for autonomously moving towards the unloading device for unloading the tote from the shelf. Preferably, the robotic shelf comprises a shelf with intermediate floors whereon the plurality of totes can be arranged horizontally and/or vertically besides each other or a robot with a tray on which the plurality of totes can be stacked.

According to a preferred implementation, the unloading arrangement comprises a castellated spacer on which the tote is arranged in the shelf, whereby the castellated spacer comprises at least two slots through which the arms can be horizontally inserted for unloading the tote from the shelf. Preferably, the castellated spacer comprises an alternate sequence of bends opened upwardly and bends opened downwardly. Each bend comprises in particular the form of a capital letter "U". "Upwardly" means that the opening of the "U" is directed to the tote which stand on the castellated spacer. "Downwardly" means that the opening of the "U" is directed away from the tote which stands on the castellated spacer. The alternate sequence of bends opened upwardly and downwardly comprises in particular the form of a sinus curve. The bends of the castellated spacer can also comprise the form of an edged "U", which means the three sides are connected via a right angle and does not comprise an arched part. Preferably, the castellated spacer is arranged between the intermediate floor of the shelf and the tote or is arranged between two stacked totes.

The object is further solved by a method for unloading a tote with an unloading device described above from a robotic shelf configured for storing a plurality of totes horizontally and/or vertically besides each other. The method comprises the following steps: Autonomously moving the shelf towards the unloading device in a robotic manner; Depending on the tote to be unloaded, moving the arms in vertical direction in respect to the position of the tote in the shelf and/or in their horizontal distance to each other in respect to the shape of the tote; Moving the arms in horizontal direction underneath the tote; Unloading the tote from the shelf with the motorized conveyer belt and/or retracting the arms away from the shelf.

It is thus an essential point that the robotic shelf is moved towards the unloading device and not the other way around as usual. The arms of the unloading device are driven into an unloading position depending on the position and/or size of each individual tote. Once the arms reach the unloading position for the individual tote to be unloaded, the arms are moved underneath the tote so that the tote stands on the arms and the arms are retracted away from the shelf and/or the arms are moved underneath the tote, preferably so far that at least the tips of the arms touch the tote and the tote is transported away from the shelf by the conveyer belt which pulls the tote onto the arms.

In order to determine the unloading position depending on the position and/or size of each individual tote, a machine-readable code arranged on each tote is scanned. Depending on the scanned machine-readable code the unloading device may receive all necessary information needed for determining the unloading position of the arms individually for each tote.

Alternatively or supplementary to the machine-readable code, the tote information is received from an unloading plan that comprises a sequence of totes to be unloaded together with the necessary tote information of each individual tote. The arms can be moved in a vertical and/or a horizontal direction in respect to the received position and/or shape of the tote that is planned to be unloaded next.

According to a preferred implementation the method further comprises the following step: Inserting the arms horizontally through the at least two slots of the tote and/or the castellated spacer; and/or lifting the arms so that the conveyer belt touches the bottom of the tote and/or the castellated spacer. "Inserting" means preferably that the arms are inserted into the slots without touching the tote and are afterwards lifted to get in touch with the tote. Then the arms are preferably inserted into the slots and the tote can be unloaded by retracting the arms together with the tote standing on the arms. "Inserting" means also preferably that the arms are moved forwardly until at least the tips of the arms touches the tote and/or the castellated spacer. The conveyer belt may touch the tote and/or the castellated spacer and may pull the tote respectively the castellated spacer onto the arms. Once the tote respectively the castellated spacer together with the tote are pulled on the arms by the conveyer belt, the arms can be retracted. If the arms are inserted into a bend that is opened upwardly in direction of the tote, only the tote may be unloaded and if the arms are inserted into a bend that is opened downwardly, the tote can be unloaded together with the castellated spacer.

According to a further preferred implementation the method further comprises the step: Dispatching the tote unloaded from the shelf with the roller belt. Such way the unloaded tote can be transported by the roller belt to a farer away location in the warehouse.

BRIEF DESCRIPTION OF DRAWINGS

In the following, the invention is further explained in detail by means of a preferred implementation with reference to the drawings.

In the drawings

DESCRIPTION OF IMPLEMENTATIONS

Figure 1A:
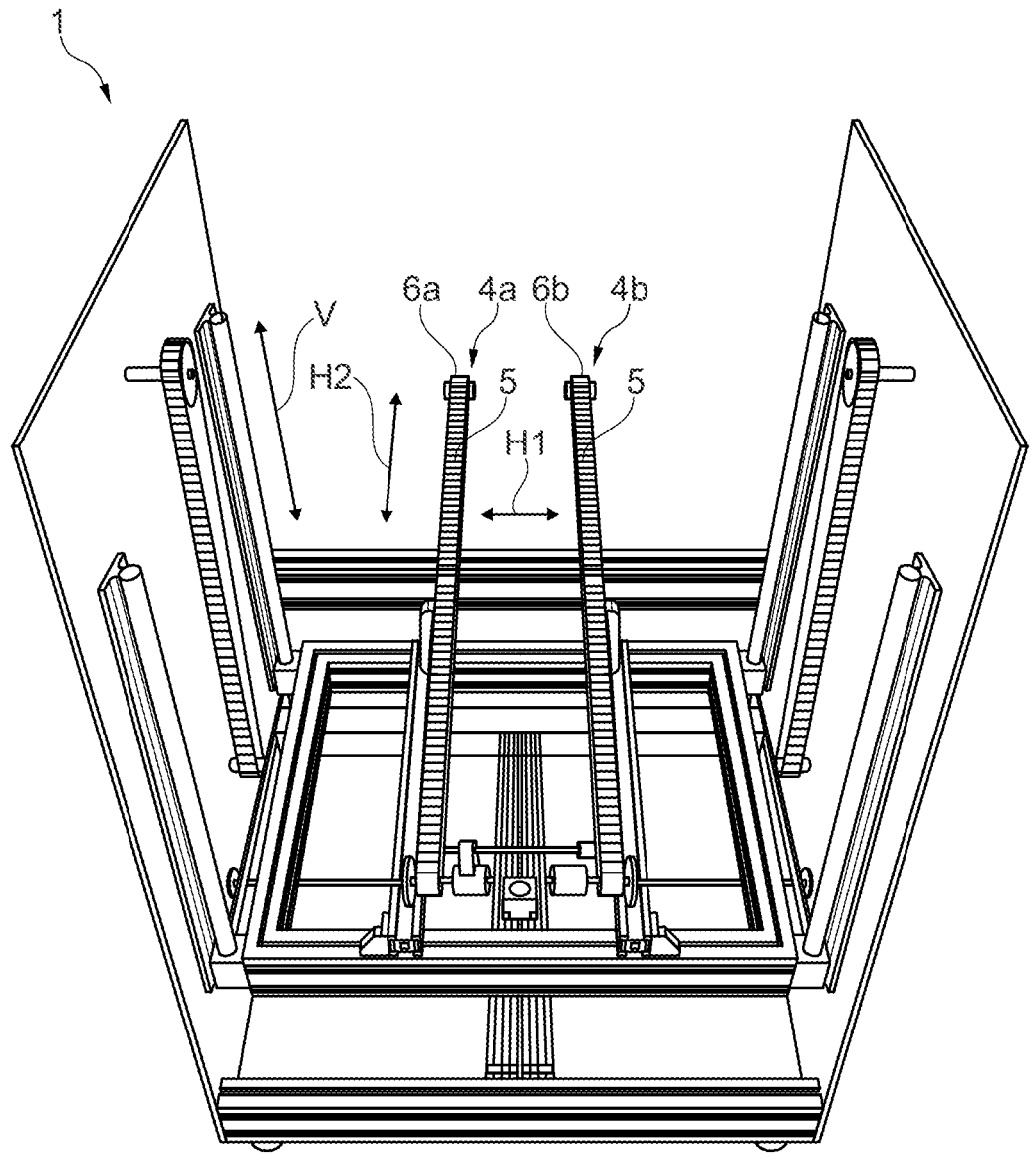
FIG. 1a schematically depicts an unloading device of a preferred implementation in an oblique view from above, FIG. 1b schematically depicts an unloading device of second preferred implementation in a perspective rear view, FIG. 2a schematically depicts a robotic shelf according to a preferred implementation in a frontal view, FIG. 2b schematically depicts a robotic shelf according to a second preferred implementation in a frontal view, FIG. 3 schematically depicts an unloading arrangement of a preferred implementation in a perspective view.

FIG. 1a shows an unloading device of a preferred implementation in an oblique view from above. The unloading device comprises two arms 4a, 4b that are movable in a vertical direction V and in a horizontal direction H1, H2. The arms 4a, 4b extend in a horizontal direction and are arranged distant and parallel to each other. Further, the arms 4a, 4b are each movable together in the same horizontal direction H1 or in the same horizontal direction H1 away from each other to adjust the distance between the arms 4a, 4b. In this concrete implementation, a conveyer belt 5 is arranged on each arm 4a, 4b that is led circumferentially around the tips 6a, 6b of the arms so that the conveyer belt 5 is completely revolving around each arm 4a, 4b and extends along the complete extension of the arms 4a, 4b on both sides.

Figure 1B:
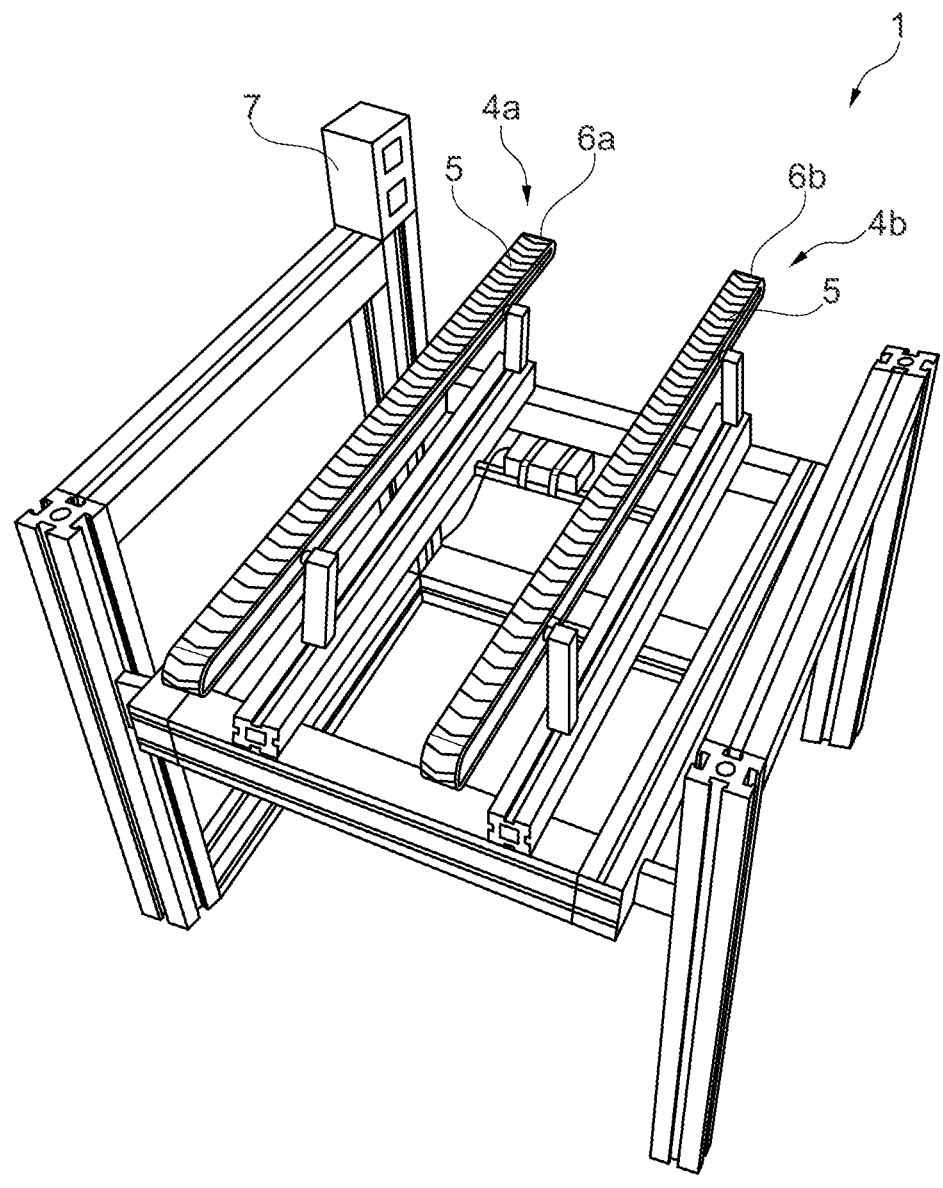

FIG. 1b shows essentially the unloading device of FIG. 1a with a scanner 7 arranged at the front of the unloading device 1. The scanner 7 in form of a camera can scan a machine-readable code 8 that is arranged on each tote 2 to be unloaded. Depending on the scanned machine-readable code, tote information is transmitted so that the unloading device 1 can move its arms 4a, 4b into an unloading position depending on the transmitted tote information comprising the position and the size of the concrete tote 2 to be unloaded. In particular, every tote 2 is scanned once again and the arms 4a, 4b are adjusted for every tote 2 individually.

Figure 2A:
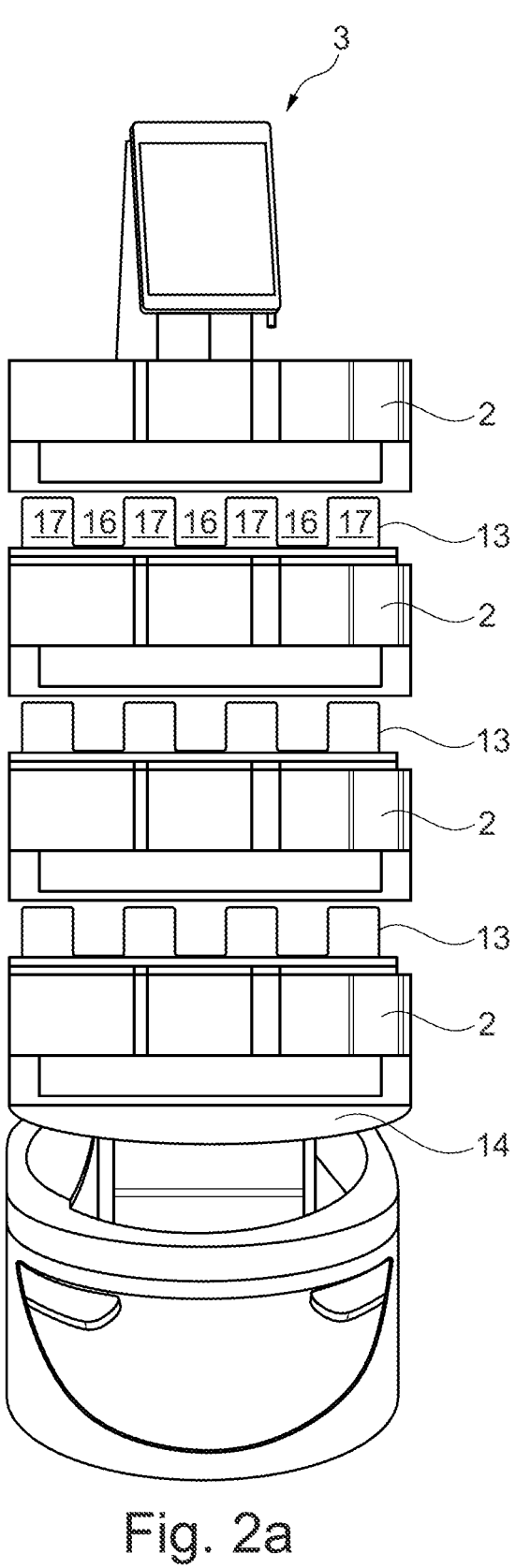

FIG. 2a shows a robotic shelf 3. The robotic shelf 3 is configured to drive autonomously and to transport a plurality of totes 2. The shelf 3 of FIG. 2a is a robot with a tray 14 on which a plurality of totes 2 are stacked. A castellated spacer 13 is arranged between the tray 14 and the lower tote 2 and between two stacked totes 2. The shelf 3 drives with its totes on it to the unloading device 1. The arms 4a, 4b of the unloading device 1 move according to the position and size of the first tote 2 to be unloaded and unloads the tote 2 from the shelf 3.

The castellated spacer 13 comprises an alternate sequence of bends opened upwardly 16 and bends opened downwardly 17. Each bend comprises the form of an edged capital letter "U", which means the three sides of the bend 16, 17 are connected via a right angle and does not comprise an arched part. Depending on whether the arms 4a, 4b are inserted into the slots 12a, 12b that are opened upwardly or that are opened downwardly, the castellated spacer 13 is unloaded together with the tote 2 that stands on the castellated spacer 13 or the tote 2 in unloaded without the castellated spacer.

Figure 2B:
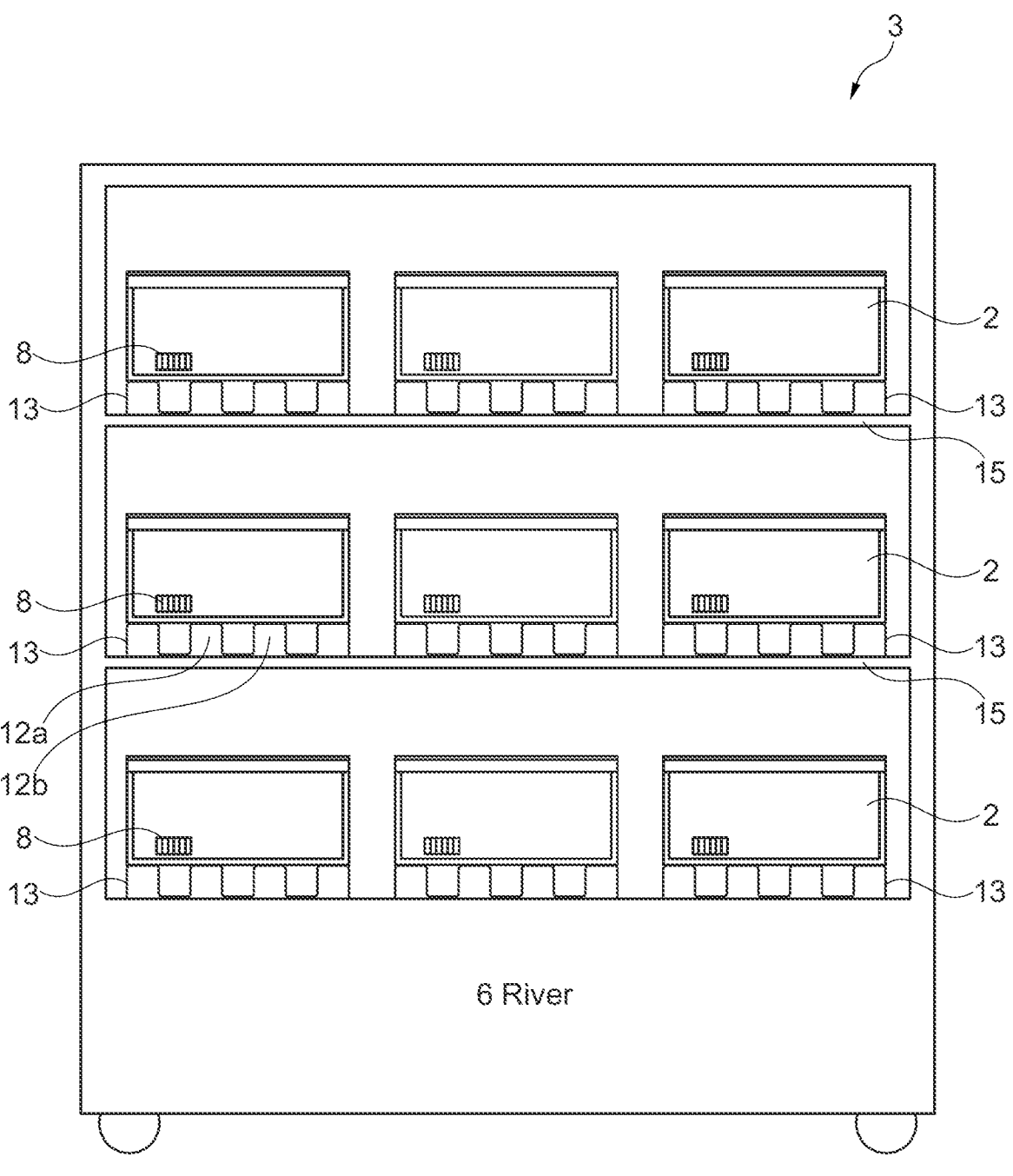

FIG. 2*b* also shows a robotic shelf 3. The robotic shelf 3 of FIG. 2*b* is constructed like a usual shelf but drives autonomously. The unloading device therefore can also unload totes 2 from usual non-robotic shelfs if they are driven to the unloading device. The shelf 3 of FIG. 2*b* comprises two intermediate floors 15 so that a plurality of totes 2 can be arranged about one another in a vertical direction. A castellated spacer 13 is arranged between each intermediate floor respectively bottom floor and the corresponding tote 2. Therefore, it is possible to unload the middle tote 2 without moving the lower and/or upper tote 2. Each tote 2 comprises the machine-readable code 8, in particular a barcode, that can be read by the scanner 7.

Figure 3:
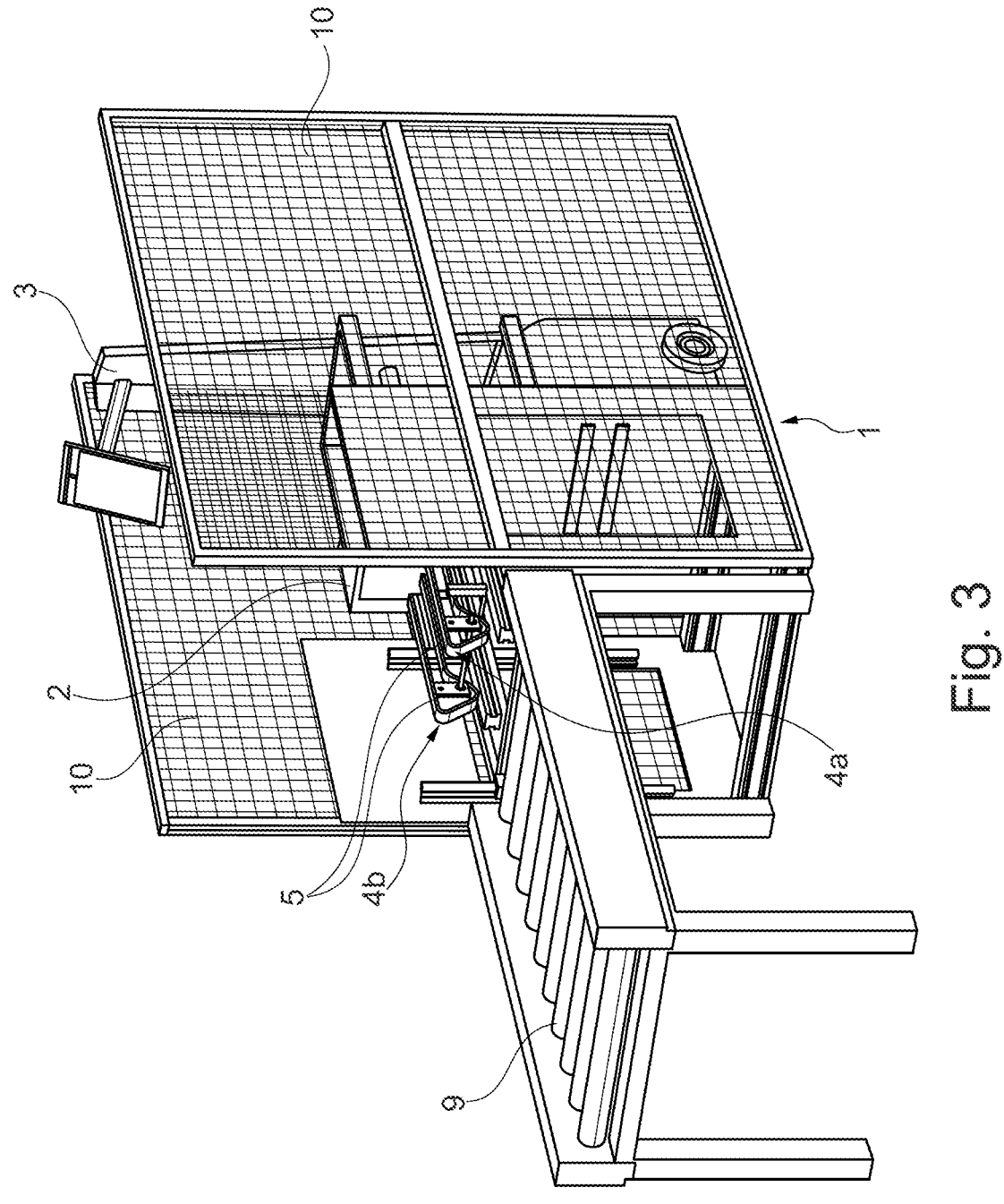

FIG. 3 shows an unloading arrangement 11 of a preferred implementation. The unloading arrangement 11 comprises the unloading device 1 with its two arms 4*a*, 4*b* and the conveyer belt extending from the tips 6*a*, 6*b* of the arms 4*a*, 4*b* and the robotic shelf 3. FIG. 3 shows the robotic shelf 3 in a parking position. The robotic shelf 3 stands at the top of the unloading device 1 ready to give off the totes 2. A roller belt 9 is arranged directly to the end of the unloading device 1, thereby extending in parallel extension of the arms 4*a*, 4*b*. On the left side and on the right side of the unloading device 1 is a machine guarding 10 arranged. The machine guarding 10 is longer than the unloading device 1 and the robotic shelf 3.

The robotic shelf 3 has to drive between the machine guarding 10 and is therefore guarded to its parking position. The arms 4*a*, 4*b* of the unloading device 1 are moved depending on the position and size of the tote 2. Once the conveyer belt 5 touches the tote 2, the conveyer belt 5 pulls the tote 2 towards the ending of the unloading device 1 and therefore towards the roller belt 9. During the unloading process the tote 2 is guarded laterally by the machine guarding 9 so that the tote 2 cannot fall off sideways.

For unloading the tote 2 from the shelf 3, the arms 4*a*, 4*b* are either pushed forward into the slots 12*a*, 12*b* of the tote 2 and/or of the castellated spacer 13 without touching the tote 2 and are afterwards lifted to get in touch with the tote 2. Then the arms 4*a*, 4*b* are inserted into the slots 12*a*, 12*b* and the tote 2 can be unloaded by retracting the arms 4*a*, 4*b* together with the tote 2 standing on the arms. Or the arms 4*a*, 4*b* are moved forwardly until at least the tips 6*a*, 6*b* of the arms 4*a*, 4*b* touches the tote 2 and/or the castellated spacer 13. Because the conveyer belt 5 extends from the tips 6*a*, 6*b* of the arms 4*a*, 4*b*, the conveyer belt 13 gets in touch with the tote 2 and/or the castellated spacer 13 if the tips 6*a*, 6*b get in touch with the tote 2 and/or the castellated spacer 13 and pulls the tote 2 respectively the castellated spacer 13 onto the arms 4***a*, 4*b*. Once the tote 2 respectively the castellated spacer 13 together with the tote 2 are pulled onto the arms 4*a*, 4*b* by the conveyer belt 5, the arms 4*a*, 4*b* are inserted into the slots 12*a*, 12*b*.

While the invention has been illustrated and described in detail in the drawings and foregoing description, such illustration and description are to be considered illustrative or exemplary and not restrictive; the invention is not limited to the dis-closed implementations. Other variations to be disclosed implementations can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SYMBOL LIST

1 unloading device
2 tote
3 robotic shelf
4*a*, 4*b* arms
5 conveyer belt
6*a*, 6*b* tips
7 scanner
8 machine-readable code
9 roller belt
10 machine guarding
11 unloading arrangement
12*a*, 12*b* slots
13 castellated spacer
14 tray
15 intermediate floor
16 bend opened upwardly
17 bend opened downwardly
H1, H2 horizontal direction
V vertical direction

The invention claimed is:

1. An unloading arrangement comprising an unloading device and a shelf configured for storing a plurality of totes horizontally and/or vertically besides each other, wherein the shelf is further configured as a robotic shelf for autonomously moving towards the unloading device for unloading the plurality of totes from the shelf, wherein the unloading device comprises at least two arms for grabbing the tote in the shelf and a roller belt adjoining the at least two arms for dispatching the tote unloaded from the shelf, whereby the arms each extend in a horizontal direction and are arranged parallel to each other, the arms are movable in a vertical and/or horizontal direction in respect to a position of the tote in the shelf and the arms are movable relative to each other to change a horizontal distance between the arms, each arm comprises a motorized conveyer belt extending along the horizontal direction on the arm for unloading the tote from the shelf onto the roller belt, and wherein the roller belt adjoins the at least two arms such that a transporting direction of the roller belt is parallel to the at least two arms.

2. The unloading device according to claim 1, wherein the roller belt extends away from the unloading device opposite and/or parallel to the at least two arms.

3. The unloading device according to claim 1, comprising a scanner configured for determining a machine-readable code on the tote comprising a vertical position and the horizontal distance between the arms for unloading the tote from the shelf and for determining the position or shape of the tote in the shelf in respect to the vertical position and the horizontal distance between the arms for unloading the tote from the shelf.

4. The unloading device according to claim 1, comprising a control device configured for receiving the position or shape of the tote in the shelf in respect to a vertical position and the horizontal distance between the arms for unloading the tote from the shelf and configured for moving the arms.

5. The unloading device according to claim 1, comprising a machine guarding configured to laterally guard the tote when unloading the tote from the shelf.

6. The unloading arrangement according to claim 1, comprising a castellated spacer on which the tote is arranged in the shelf, whereby the castellated spacer comprises at least two slots through which the arms are horizontally inserted for unloading the tote from the shelf.

7. The unloading device according to claim 1, wherein the motorized conveyer belt extends along the horizontal direction on the arm up to touching a tip of a respective arm.

8. The unloading device according to claim 7, wherein the motorized conveyer belt is led in circumferentially around at least the tip and/or wherein the motorized conveyer belt extends along a complete extension of the arm.

9. A method for unloading a tote, the method being performed with an unloading arrangement comprising an unloading device and a shelf configured for storing a plurality of totes horizontally and/or vertically besides each other, wherein the shelf is further configured as a robotic shelf for autonomously moving towards the unloading device for unloading the plurality of totes from the shelf, wherein the unloading device comprises at least two arms for grabbing the tote in the shelf and a roller belt adjoining the at least two arms for dispatching the tote unloaded from the shelf, whereby the arms each extend in a horizontal direction and are arranged parallel to each other, the arms are movable in a vertical and/or horizontal direction in respect to a position of the tote in the shelf and the arms are movable relative to each other to change a horizontal distance between the arms, each arm comprises a motorized conveyer belt extending along the horizontal direction on the arm for unloading the tote from the shelf onto the roller belt, and wherein the roller belt adjoins the at least two arms such that a transporting direction of the roller belt is parallel to the at least two arms, the method comprising the following steps:

autonomously moving the shelf towards the unloading device;

depending on the tote to be unloaded, moving the arms in a vertical direction in respect to the position of the tote in the shelf and/or moving the arms relative to each other to change a horizontal distance between the arms;

moving the arms in the horizontal direction underneath the tote;

unloading the tote from the shelf with the motorized conveyer belt and/or retracting the arms away from the shelf.

10. The method of claim 9, further comprising the following steps:

inserting the arms horizontally through the at least two slots of the tote or the castellated spacer; and lifting the arms so that the motorized conveyer belt touches the bottom of the tote or the castellated spacer.

11. The method of claim 9, further comprising the following step:

dispatching the tote unloaded from the shelf with the roller belt.

\* \* \* \* \*